Aug. 26, 1958 K. RIESZ 2,849,564

ELECTRORESPONSIVE DEVICES

Filed Oct. 29, 1953 2 Sheets-Sheet 1

WITNESSES:

E. A. McCloskey.

David M. Schiller

INVENTOR

Kolman Riesz.

BY C. L. Freedman

ATTORNEY

Aug. 26, 1958 K. RIESZ 2,849,564

ELECTRORESPONSIVE DEVICES

Filed Oct. 29, 1953 2 Sheets-Sheet 2

WITNESSES:

E. A. McCloskey

David M. Schiller

INVENTOR

Kolman Riesz.

BY C. L. Freedman

ATTORNEY 2,849,564

ELECTRORESPONSIVE DEVICES

Kolman Riesz, Gillette, N. J., assignor to Westinghouse Electric Corporation, East Pittsburgh, Pa., a corporation of Pennsylvania Application October 29, 1953, Serial No. 389,031

9 Claims. (Cl. 200—91)

This invention relates to electroresponsive devices and in particular to rotor assemblies for induction-type alternating-current devices.

In the past electroresponsive devices have been provided which have rotor assemblies mounted for rotation relative to an associated stator assembly in response to energization of the stator assembly.

The rotor assemblies generally comprise an armature which is in the form of an electroconductive disc mounted on a shaft for rotation under the influence of magnetic flux produced by energization of the stator assembly. Suitable translating means such as contact means are carried by the rotor assembly. The contact means may engage fixed contact means secured to the stator assembly to effect the esablishment of one or more electrical circuits upon roation of the rotor assembly.

Heretofore the construction of such rotor assemblies has been accomplished at the expense of considerable time and money due mainly to the difficulties encountered in attempting to properly secure the disc armature to the associated shaft.

In accordance with the invention a rotor assembly is provided which includes a disc armature and an associated shaft with the disc and shaft being united by means of a member of one part construction. The member may be applied to the disc and shaft in any suitable manner, such as by a molding operation.

In a preferred embodiment of the invention the disc armature is provided with a centrally disposed opening and additional openings communicating with the central opening. The shaft and disc are positioned relative to each other with the shaft extending through the central opening coaxially thereof. The shaft and disc are held in the desired position and are disposed as inserts in a suitable mold. A suitable fluid material is introduced into the mold as by a transfer molding operation to completely fill the central opening and the additional openings of the disc and to engage the shaft and portions of the disc adjacent such openings. Upon hardening of the molding material the disc and shaft are united to provide a rigid rotor assembly.

It is, therefore, an object of the invention to provide an improved electroresponsive device.

It is another object of the invention to provide an an improved rotor assembly for an induction-type device.

It is still another object of the invention to provide a rotor assembly for an induction-type relay device including an electroconductive disc and an associated shaft with improved means for uniting the disc and the shaft.

It is a further object of the invention to provide a rotor assembly for an induction-type relay device including an electroconductive disc having a central opening and a shaft positioned within the opening and extending transverse to the plane of the disc with an insulating member molded around the shaft and engaging portions of the disc adjacent the central opening for uniting the shaft and disc.

It is another object of the invention to provide an improved method of assembling a rotor assembly for an induction-type relay device.

It is still another object of the invention to provide a method of assembling a rotor assembly including an electroconductive disc and an associated shaft whereby distortion of the disc during assembly is prevented.

Other objects of the invention will be apparent from the following description taken in conjunction with the accompanying drawings, in which.

The invention may be applied to electroresponsive devices of various types, and is illustrated in connection with an electroresponsive relay of the type shown and described in patent application Serial No. 251,234, filed October 13, 1951, by W. K. Sonnemann, now Patent No. 2,697,187, issued Dec. 14, 1954, and assigned to the Westinghouse Electric Corporation.

Figure 1:
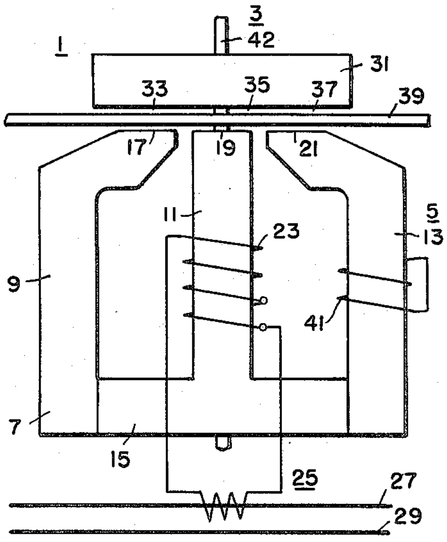
Figure 1 is a view in elevation with parts schematically shown of an electroresponsive device embodying the invention.

Referring to the drawing there is illustrated in Fig. 1 an electroconductive relay device 1 which is responsive to variable alternating quantities and which includes a rotor assembly 3 and a stator assembly 5. Energization of the stator assembly 5 operates to effect the rotation of the rotor assembly 3 relative to the stator 5.

The stator assembly 5 includes a magnetic structure 7 which is effective when energized to produce three time-dispaced magnetic flux components creating a shifting magnetic field for influencing the associated rotor assembly. To this end, the magnetic structure 7 is of substantially E-shaped configuration and comprises three pole pieces 9, 11 and 13 disposed in a common plane and connected magnetically by means of a magnetic bridge 15. The pole pieces 9, 11 and 13 have respectively pole faces 17, 19 and 21, disposed in a common plane which is transverse to the plane of the pole pieces.

In order to effect the energization of the magnetic structure 7 an energizing winding 23 surrounds the intermediate pole piece 11. The winding 23 may be connected for energization in accordance with any desired quantity and is illustrated as being connected for energization through a current transformer 25 in accordance with alternating-current of an alternating-current circuit represented by the conductors 27 and 29 and operating at a frequency of 60 cycles per second.

For the purpose of reducing the reluctance of magnetic paths offered to magnetic flux produced by energization of the winding 23, a magnetic member 31 is disposed adjacent the pole faces 17, 19 and 21 to define therewith air gaps 33, 35 and 37. An electroconductive armature 39, constituting a portion of the rotor assembly, is mounted for rotation through the air gaps 33, 35 and 37 under the influence of the shifting magnetic field therein.

In order to establish a phase displacement between certain of the magnetic fluxes produced by energization of the winding 23 for creating a shifting magnetic field in the region of the air gaps, a closed circuit lagging winding 41 surrounds the pole piece 13.

Figure 2:
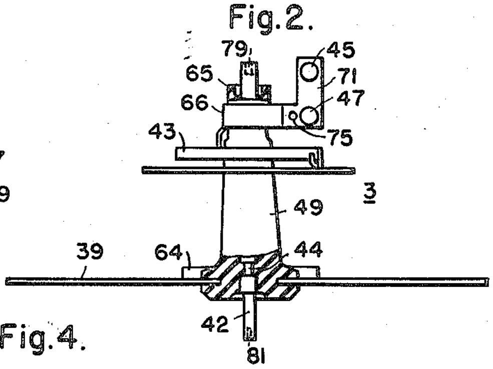
Fig. 2 is a view in elevation with parts broken away of a rotor assembly suitable for use in the device of Fig. 1.

Referring now to Fig. 2 there is illustrated a rotor assembly suitable for use in the relay device of Fig. 1. As there shown, the rotor assembly 3 includes the disc armature 39 which may be constructed of any suitable electroconductive material, such as aluminum. The disc 39 is mounted on a shaft 42 for rotation relative to the stator assembly 5 against the bias exerted by a conventional spiral control spring 43. The shaft 42 is preferably constructed of the same material employed for the disc 39, and is provided with a portion 44 of reduced diameter. The inner end of the spring 43 may be secured to the shaft 42 whereas the outer end of the spring 43 may be secured to a portion of the stator assembly 5.

In order to compensate for variations in torque exerted by the spring 43 as the armature rotates and to improve the performance of the relay device, the disc 39 is provided with a spiral configuration. The effect of providing the disc 39 with a spiral periphery is explained in the aforementioned patent application, Serial No. 251,234. Suitable contact members 45 and 47 are carried by the rotor assembly 3 for engagement with fixed contacts (not shown) to complete an electrical circuit when the magnetic structure 7 is sufficiently energized. Such circuit completion may be employed for any desired purpose.

In the past, considerable difficulty has been experienced in the construction of rotor assemblies for electroconductive relays. This has been due primarily to the complex arrangements and multiplicity of parts employed for mounting the disc armature on the disc-supporting shaft.

In accordance with the invention the disc 39 and the shaft 42 are united by means of a member 49 which is of one part construction and which engages the shaft 42 and portions of the disc 39. The member 49 may be applied to the disc and shaft in any suitable manner, and is conveniently applied as by a molding operation. As will presently appear, a transfer molding operation is preferably employed to unite the disc 39 and shaft 42.

Figure 7:
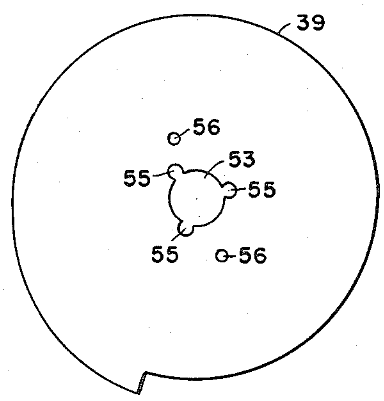
Fig. 7 is a view in top plan of an electroconductive armature suitable for use in the rotor assembly of Fig. 2.

Referring now to Fig. 7 there is illustrated a disc armature 39 suitable for use in the rotor assembly 3 of the relay 1. As there shown, the disc 39 is provided with a central opening 53 and a plurality of additional openings 55 communicating with the central opening 53 and being spaced around the periphery thereof. A pair of openings 56 of the disc are provided to permit the securing of the disc relative to the mold during the molding operation. Prior to the molding operation the disc and shaft are positioned relative to each other with the shaft extending through the opening 53 of the disc 39 in a direction transverse to the plane of the disc 39. The shaft is positioned substantially coaxial of the opening 53 with the terminals of the shaft spaced from the plane of the disc by distances sufficient to permit rotation of the disc 39 without interference from the stator assembly 5. The disc 39 and shaft 42 may be held in the desired position in any suitable manner during the molding operation.

Figure 8:
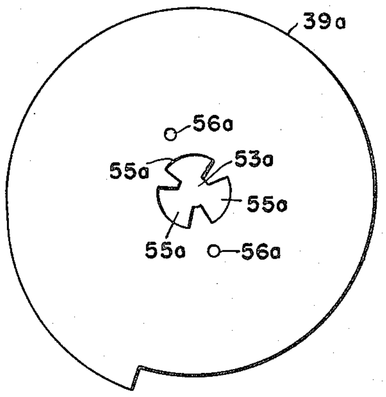
Fig. 8 is a view similar to Fig. 7 showing a different construction of the armature of Fig. 7.
Figure 5:
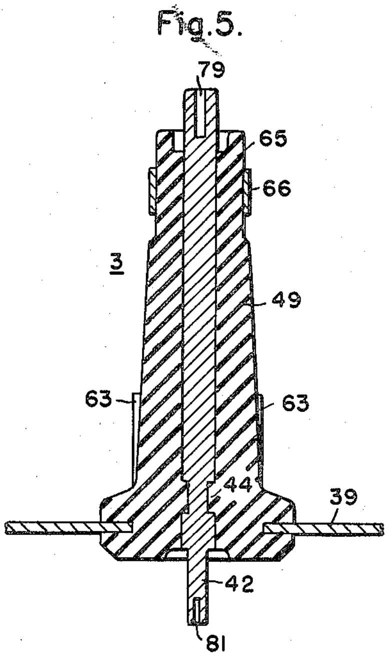
Fig. 5 is a view taken along the line V—V of Fig. 4.

With reference to Fig. 8 there is shown a disc armature 39*a* similar to the disc 39 of Fig. 7. The disc 39*a* is provided with a central opening 53*a* and a plurality of additional openings 55*a* communicating with the opening 53*a*. By inspection of Figs. 7 and 8 it will be observed that the central opening 53*a* has a radius which is slightly smaller than the radius of the opening 53 of the disc 39. The opening 53*a* is proportioned to receive the associated shaft with small clearance between the shaft and the walls of the opening thereby facilitating positioning of the shaft and disc prior to the molding operation. Openings 56*a* similar to the openings 56 of the disc 39 may be provided in the disc 39*a*.

The disc 39 and the shaft 42 are preferably united by means of a transfer molding operation. Transfer molding is desirable since forces exerted on mold inserts during a transfer molding operation are considerably less than forces exerted on inserts during other molding operations. Consequently, distortion of the shaft and disc, and displacement of the shaft and disc relative to each other are less likely to occur during a transfer molding operation.

Figure 3:
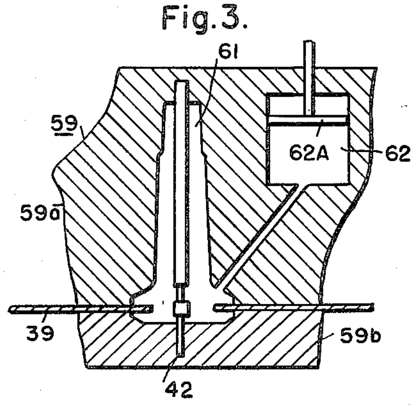
Fig. 3 is a schematic view illustrating a preferred process for assembling the rotor assembly.

With reference to Fig. 3 there is shown a mold 59 suitable for uniting the disc 39 and the shaft 42. As there shown, the mold 59 includes two cooperating parts 59*a* and 59*b*. Each of the mold parts 59*a* and 59*b* is provided with a recess for defining a mold cavity 61 when the parts are closed upon the disc 39 as illustrated. The part 59*a* is provided with a transfer chamber 62 containing a hardenable fluid material which is brought to a plastic state by the application of heat and pressure in a conventional manner thereto prior to the introduction thereof into the mold cavity 61.

It is desirable that the shaft 42 be constructed of a metallic material, such as aluminum. By selecting molding material having good insulating properties, a metallic shaft may be employed with the molding material providing an insulating barrier between the shaft 42 and the contacts 45 and 47. In addition, it is desirable that the molding material, the shaft 42 and the disc 39 have substantially the same temperature coefficient of expansion. Material comprising a phenol-formaldehyde resin and an alpha cellulose filler has substantially the same temperature coefficient of expansion as aluminum for temperatures encountered during a transfer molding operation. Such material is thermosetting and possesses good insulating qualities and may be satisfactorily employed in a transfer molding operation for uniting the disc 39 and shaft 42.

In order to assemble the rotor assembly 3, the disc 39 and the shaft 42 are positioned as inserts in the mold cavity 61 by means of suitable slots in the mold parts 59*a* and 59*b*. The molding material is then introduced under pressure into the cavity 61 from the chamber 62 in any suitable manner as by displacement of a piston 62A located in the chamber 62. The material completely surrounds the shaft 42 over a substantial length thereof and fills the portion 44 of reduced diameter of the shaft. The material also fills the openings 53 and 55 of the disc 39 and engages surfaces of the disc adjacent such openings. By means of heat applied to the mold cavity 61 the thermosetting material is subsequently hardened to provide the member 49. Pressures exerted on the disc and shaft during the molding operation are distributed substantially uniformly thereon whereby distortion of the disc and shaft is prevented. During the molding operation the member 49 may be provided with suitable ribs 63. In addition, a counterweight 64 may be molded to the disc 39 for the purpose of providing a balanced rotor assembly.

Figure 4:
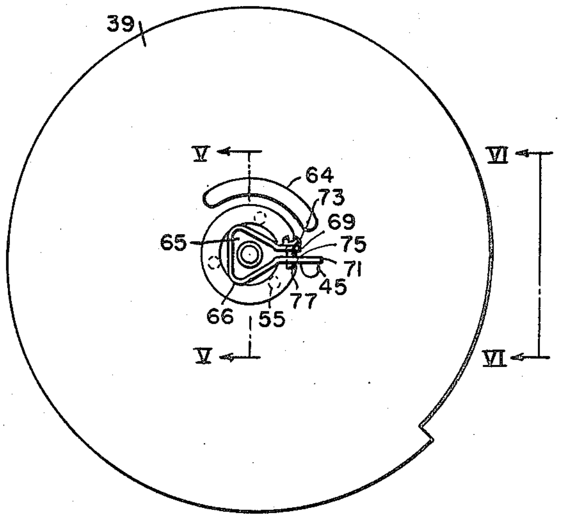
Fig. 4 is a view in top plan with parts removed of the rotor assembly of Fig. 2.
Figure 6:
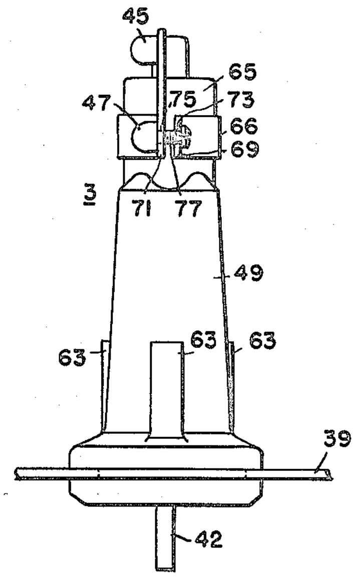
Fig. 6 is a view taken along the line VI—VI of Fig. 4.

With reference to Fig. 4 it is observed that the member 49 is formed with a portion 65 of substantially triangular section. In order to secure the contacts 45 and 47 to the member 49, a contact-supporting member 66 is provided having a portion of substantially triangular section surrounding the portion 65 of the member 49. As shown in Figs. 4 and 6, the member 66 is provided with a pair of extensions 69 and 71 which project from two sides of the triangular portion of the member 66 to define a pair of parallel planes. The contacts 45 and 47 may be secured to the extension 71 in any desired manner.

To secure the contact-supporting member 66 to the triangular portion 65 of the member 49, clamping means are provided to clamp the extensions 69 and 71 together for effecting tight engagement between the associated sides of the portion 65 of the member 49 and the portion 67 of the contact-supporting member 66. To this end the extensions 69 and 71 may be provided respectively with a pair of aligned openings 73 and 75 proportioned to receive the threaded stem of a screw member 77 with the opening 75 being threaded to threadedly engage the stem. The head of the screw member 77 engages the extension 69, whereby axial movement of the screw member is substantially prevented during rotation thereof to effect the desired clamping action. Rotation of the screw member 77 may be effected in any desired manner.

To facilitate the mounting of the shaft 42 for rotation relative to the stator 5, openings 79 and 81 may be provided at the upper and lower terminals, respectively, of the shaft 42. The openings 79 and 81 are proportioned to receive suitable pivot pins (not shown) for rotation in suitable bearings (not shown) of the stator 5.

Advantages of the invention are numerous. By means of the molded member 49, which surrounds the shaft 42 and engages portions of the disc 39, the shaft and disc are firmly secured in the desired position relative to one another to provide a rigid rotor assembly. Provision of the portion 44 of the shaft 42 and the openings 55 of the disc 39 provides large and irregular surfaces of contact between the molding material and the shaft and disc and assures a rigid structure. By selecting molding material having insulating qualities, a metallic shaft may be employed as a part of the rotor assembly. In addition, the one piece construction of the member 49 results in substantial saving of time and money heretofore expended in the assembly of rotor assemblies having a plurality of parts. Furthermore, undesirable contact of metallic parts resulting in corrosion is eliminated. By employing a transfer molding operation, the disc and shaft may be united without breakage or distortion thereof during assembly. The provision of a terminal portion of non-circular section of the member 49 assures rigid clamping of the contact supporting member 66 to the member 49.

Although the invention has been described with reference to certain specific embodiments thereof, numerous embodiments thereof are possible, and it is desired to cover all modifications and embodiments falling within the spirit and scope of the invention.

I claim as my invention:

1. A rotor assembly for an induction-type instrument comprising a shaft having an annular groove, an electroconductive armature having a first opening, said shaft extending through said first opening with clearance with said annular groove positioned adjacent said first opening, said armature being provided with an additional opening communicating with said first opening, and means uniting said armature and said shaft in spaced relation, said means comprising a member formed of an insulating material engaging said shaft and filling said annular groove, said additional opening and said first opening, said shaft having a pair of ends which are positioned clear of said insulating member to permit supporting of said shaft for rotation about the axis of the shaft.

2. A rotor assembly for an induction-type relay device comprising a shaft, an electroconductive armature having an opening, said shaft extending through said opening with clearance, a member of one part construction formed of insulating material surrounding said shaft and engaging said armature in intimate interlocking relationship for uniting said shaft and said armature in spaced relation, and circuit controlling means carried by said insulating member.

3. In an induction instrument responsive to alternating energization, a rotor assembly comprising an electroconductive armature designed for rotation about an axis, shaft means having a separate portion disposed on said axis on each side of the armature, and a one-part insulating member intimately engaging each of said portions of the shaft means and said armature to constitute the only mechanical connection of the shaft means to the armature, said armature having at least one opening through which said insulating member extends, said insulating member being in intimate interlocking relationship relative to the armature, and said insulating member having an exposed portion spaced from the armature in an axial direction, whereby accessory equipment may be secured to said exposed portion and may be insulated by the insulating member from the armature.

4. A rotor assembly for an electrical instrument comprising electroconductive armature means designed for rotation about an axis, shaft means spaced from said armature means, said shaft means having a separate portion disposed on said axis at each side of the armature means, and an insulating member of integral construction intimately engaging each of said portions of the shaft means and said armature means to constitute the only mechanical connection of the shaft means to the armature means, said insulating member being in interlocking relationship relative to said armature means, said shaft means having a pair of ends which are positioned clear of said insulating member to permit supporting of said shaft means for rotation about said axis.

5. A rotor assembly for an induction-type instrument comprising shaft means, an electroconductive armature spaced from and surrounding the shaft means, said shaft means being located in concentric relation with said armature, and a member of one-part construction formed of an insulating material engaging the shaft means and the armature in intimate interlocking relationship for uniting the shaft means and the armature in spaced relation, said shaft means having a pair of ends which are positioned clear of the insulating member to permit supporting of the shaft means for rotation about the axis of the shaft means.

6. A rotor assembly for an induction-type instrument comprising shaft means, an electroconductive armature spaced from and surrounding the shaft means, said shaft means being located in concentric relation with said armature, and a member of one-part construction formed of an insulating material engaging the shaft means and the armature in intimate interlocking relationship for uniting the shaft means and the armature in spaced relation, said shaft means having a pair of ends which are positioned clear of the insulating member to permit supporting of the shaft means for rotation about the axis of the shaft means, said shaft means, armature and insulating member being formed of materials having substantially the same temperature coefficient of expansion.

7. A rotor assembly for an induction-type instrument comprising a shaft having an annular groove, an electroconductive armature having a first opening, said shaft extending through said first opening with clearance with said annular groove positioned adjacent said first opening, said armature being provided with an additional opening communicating with said first opening, and means uniting said armature and said shaft in spaced relation, said means comprising a member formed of an insulating material engaging said shaft and filling said annular groove, said additional opening and said first opening, said shaft having a pair of ends which are positioned clear of said insulating member to permit supporting of said shaft for rotation about the axis of the shaft, said shaft, armature and insulating member being formed of materials having substantially the same temperature coefficient of expansion.

8. A rotor assembly for an induction-type relay device comprising shaft means, an electroconductive armature having an opening, said shaft means extending through said opening with clearance to be concentrically located with respect to said armature, a member of one-part construction formed of insulating material surrounding the shaft means and engaging the armature in intimate interlocking relationship for uniting the shaft means and the armature in spaced relation, and circuit controlling means carried by said insulating member, said shaft means having a pair of ends which are positioned clear of said insulating member to permit supporting of said shaft means for rotation about the axis of the shaft means, said shaft means and said armature being formed of materials having substantially the same temperature coefficient of expansion as the material of the insulating member.

9. In an induction-type relay device, a magnetic structure, an electroconductive armature having an opening, means mounting the armature for rotation relative to the structure under influence of magnetic flux produced by energization of the structure, said means including shaft means extending through said opening, and an insulating member of one-part construction surrounding the shaft means and engaging said armature in direct intimate interlocking relationship, said shaft means having a pair of ends which are positioned clear of the insulating member; and circuit controlling means carried by said insulatng member.

References Cited in the file of this patent

UNITED STATES PATENTS

| | | |
|---|---|---|
| 1,521,766 | Harris | Jan. 6, 1925 |
| 1,754,154 | Fitz Gerald | Apr. 8, 1930 |
| 1,766,658 | Leake | June 24, 1930 |
| 1,837,723 | McGraw | Dec. 22, 1931 |
| 1,893,179 | Parsons | Jan. 3, 1933 |
| 1,971,396 | De Waide | Aug. 28, 1934 |
| 1,977,876 | Groff | Oct. 23, 1934 |
| 1,996,210 | Lord et al. | Apr. 2, 1935 |
| 2,110,655 | Bancker | Mar. 8, 1938 |
| 2,134,956 | Scheg | Nov. 1, 1938 |
| 2,459,543 | Schmerheim | Jan. 18, 1949 |
| 2,531,518 | Kuhlmann | Nov. 28, 1950 |
| 2,643,418 | Auldridge | June 30, 1953 |
| 2,752,539 | Sonnemann | June 26, 1956 |

FOREIGN PATENTS

| | | |
|---|---|---|
| 501,019 | Great Britain | Feb. 20, 1939 |